United States Patent [19]
Loomis

[11] 3,833,841
[45] Sept. 3, 1974

[54] PRIME MOVER WITH INTERNAL POWER SOURCE

[76] Inventor: Donald D. Loomis, 5402 Gilbert Dr., San Diego, Calif. 92115

[22] Filed: Nov. 26, 1971

[21] Appl. No.: 202,160

[52] U.S. Cl. ............... 318/139, 318/440, 310/154, 318/138, 310/68
[51] Int. Cl. ........................................ H02p 13/18
[58] Field of Search ............... 58/23; 318/139, 440; 310/46, 47, 67, 68, 66

[56] References Cited
UNITED STATES PATENTS

| | | | |
|---|---|---|---|
| 3,025,443 | 3/1962 | Wilkinson et al. | 318/138 |
| 3,131,341 | 4/1964 | Kniazeff | 318/341 |
| 3,296,469 | 1/1967 | Hall | 318/138 |
| 3,333,172 | 7/1967 | Brailsford | 318/138 |
| 3,373,328 | 3/1968 | Hobo | 318/138 |
| 3,453,514 | 7/1969 | Rakes et al. | 318/138 |
| 3,534,203 | 10/1970 | Sommoria | 310/46 |
| 3,582,656 | 6/1971 | Koehler | 58/23 |
| 3,609,957 | 10/1971 | Emerson et al. | 58/23 |

Primary Examiner—G. R. Simmons
Attorney, Agent, or Firm—Brown & Martin

[57] ABSTRACT

A prime mover utilizing an internal direct current power source. The preferred source is a battery adapted to convert energy from spontaneous nuclear disintegration into electrical current. Such a nuclear battery is employed to take advantage of its long life and is utilized in conjunction with a solid state electronic switch to convert the DC current generated by the battery into alternating current to produce periodic polarity reversal on a coil. The timing of the polarity reversal and the number of coils utilized determine the operating speed of the motor.

6 Claims, 3 Drawing Figures

PATENTED SEP 3 1974

3,833,841

INVENTOR.
DONALD D. LOOMIS
BY Brown & Martin
ATTORNEYS

PRIME MOVER WITH INTERNAL POWER SOURCE

BACKGROUND OF THE INVENTION

The design of prime movers for converting electrical energy into mechanical energy has been constrained by the universal assumption that an external power source would be required. Thus, electrical power was normally brought in from the exterior of the device and transferred by some form of commutator utilizing, for example, contacting brushes, to the rotating electrical apparatus. Brushless motors, for use in conjunction with alternating current are available. However these motors are somewhat inefficient, and therefore utilizable only in limited applications. They have no equivalent in a motor designed to utilize direct current.

The design constraints that have been placed on prime movers of the prior art have resulted in the development of prime movers, which are fixed in position because of their great weight and size, subject to frequent breakdown and repair, and dependent upon a remote source of electrical power delivered to their position.

Thus, it would be desirable if there could be developed a prime mover with increased portability and independence of external power sources. Especially if such a prime mover could be made independent of mechanical switching, and if it could be made synchronous to maintain a constant rotational speed.

SUMMARY OF THE INVENTION

The invention incorporates a plurality of relatively rotatable means that mount magnet means. The magnet means are mounted so as to be at the same axial distance and spaced equal rotational amounts. They are spaced along the axis of rotation to move in close proximity to one another.

In an exemplary embodiment of the invention, the stator of the prime mover incorporates fixed polarity magnet means, that is the stator mounts either permanent magnets, or DC electrical magnets, and these magnets are mounted fixedly against rotation. It is to be understood however, that this configuration is for exemplary purposes only, and it is within the scope of the invention to mount AC electromagnets on the stator and DC magnets on the rotor. This and other variations in accordance with well known electric motor design are understood to be within the scope of the invention.

In the exemplary embodiment, the DC power source comprises a plurality of power cells for converting electrical energy from the spontaneous disintegration of atomic particles to electrical power. These nuclear power cells may be based on thermionic conversion of atomically generated heat to electrical energy, on the delta emission, direct conversion technique. With either type of nuclear cell the principal advantage over conventional batteries is their ability to produce a relatively high current over extremely long lifetimes. These nuclear power cells are connected to a solid state electronic switch such as, the type of self-resetting switch frequently referred to as a flip-flop. The flip-flop has an inherent frequency characteristic, and for purposes of this embodiment may be selected to have a 60 cycles per second reversal rate, so that when the flip-flop is provided with DC electrical power, it produces an AC electrical output of 60 cycles per second. In the exemplary embodiment, one such flip-flop is employed in association with each AC electromagnetic coil however, it is possible to utilize a single flip-flop and supply power to all of the electromagnetic coils on each rotor from that single flip-flop. The stator will preferably also employ nuclear power cells, to take advantage of the same high-current, long-life, characteristics utilized on the rotor, and produce a relatively strong and stable magnetic field over substantially the same lifetime as the batteries utilized on the rotor. Since the magnetic field intended for the stator is to be steady, no flip-flop need be employed, and the nuclear power cell may be connected directly to the electromagnetic coil. These coils are spaced from the axis of rotation, the same distance as the coils mounted on the rotor, so that they may be moved in close association to one another during rotation. Because of the need to "spin up" the device prior to placing it on line to be described more fully hereinafter, it may be desirable to provide a manual switch between each power source and the DC electromagnetic coils, to withhold the application of current, and therefore the production of magnetism, until the rotor has reached the proper speed.

The spin up is necessitated by the fact, that the prime mover of the invention is substantially a synchronous machine. That is, it operates at one speed only, and produces its full rated power at that speed. Should it be attempted to draw more than the full rated power of the device from the prime mover, it will drop out of synchronization and stop. Thus, it is necessary to spin up, or rotate, the rotor by auxiliary means and to bring it up to, at least, the normal operating speed of the motor. Then the electrical power to the stator may be switched on, and the prime mover will thereafter maintain itself in synchronization.

In the exemplary embodiment, a second rotor, mouned on the opposite side of the stator from the first rotor, is employed. The first and second rotors are fixedly connected for rotation with one another. However, the electromagnetic means on the second rotor are rotationally displaced from those on the first. With four electromagnetic coils located around the periphery of each rotor, this spacing would be substantially 22 ½°. The purpose for this rotational displacement is to produce a more continuous flow of power from the motor. The corresponding electromagnetic coils on the first and second rotors pass in association with a DC electromagnetic means on the stator, producing a constant pulling and pushing action in opposition to the electromagnetic field generated by the coils on the stator.

Thus, there has been produced a prime mover which may be entirely self-contained and develope mechanical power, at a synchronous speed, for considerable periods of time, without the necessity of mechanical switching of electrical power.

It is therefore an object of the invention to provide a new and improved prime mover with an internal power source.

It is another object of the invention to provide a new and improved prime mover without any mechanical switching of electrical power.

It is another object of the invention to provide a new and improved prime mover that produces power at a synchronous speed from a direct current power source.

It is another object of the invention to provide a new and improved prime mover that is portable.

It is another object of the invention to provide a new and improved prime mover that is low in cost.

It is another object of the invention to provide a new and improved prime mover that is high in reliability.

It is another object of the invention to provide a new and improved prime mover that is low in maintenance.

Other objects and many attendant advantages of the invention will become more apparent upon a reading of the following detailed description together with the drawing, in which like reference numerals refer to like parts throughout and in which.

Figure 1:
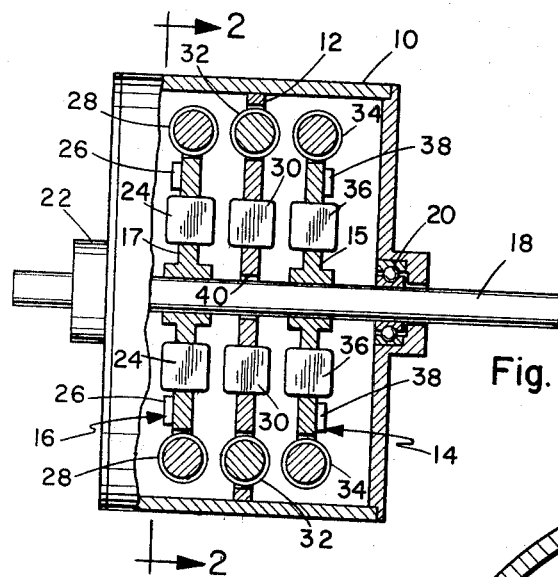
FIG. 1 is a side elevation view, partially sectioned, of the prime mover.
Figure 2:
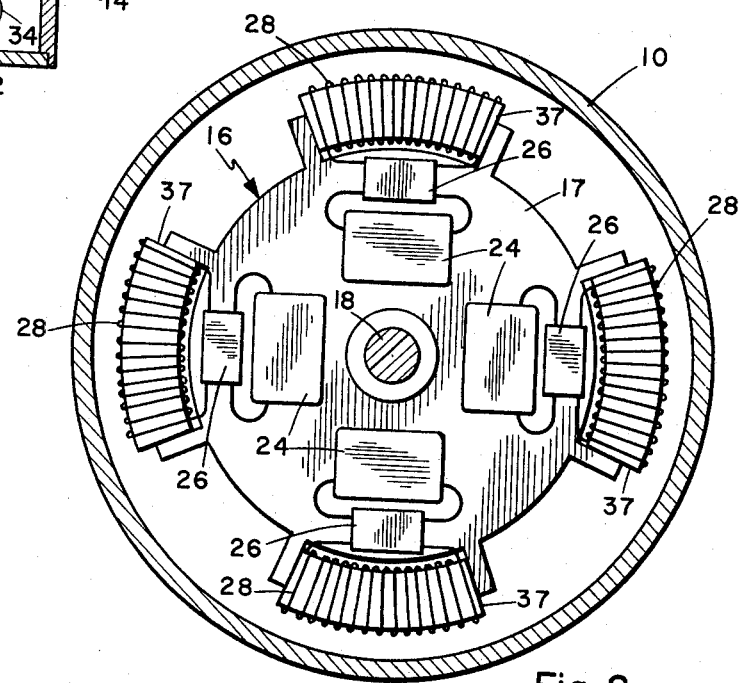
FIG. 2 is an enlarged sectional view taken on line 2—2 of FIG. 1.

Referring now to the drawings, there is illustrated a frame or housing 10, fixedly supporting a stator 12, and rotatably supporting rotors 14 and 16. The rotors are carried on a shaft 18 supported for rotation in bearings 20 and 22, and passing through the stator frame in a cylindrical bore 40. Rotor 16 is illustrated as including a frame member 17 supporting a plurality of power cells 24 electrically connected to flip-flops 26. Similarly, rotor 14 includes a frame 15 carrying a plurality of power cells 36 which are electrically connected to a plurality of flip-flops 38. On both rotors the flip-flops are wired to a plurality of circumferentially spaced coils 28 and 34 respectively. The configuration of the two identical rotors is best understood by reference to FIG. 2 which illustrates the mounting of the various parts on rotor 16. As is indicated in that view, the coils 28 each comprise a plurality of turns of wire on a core 37. In a typical application, the coil would comprise 1,000 ampere turns on a ½ inch diameter and 4 inch long, ceramic ferrite core. The core and correspondingly the configuration of the coil may desirably be made to conform to the circumference of the circle at that radius from the axis of rotation. Stator 12 carries a plurality of power cells 30 connected to circumferentially spaced coils 32.

As has been indicated, the invention finds particular utility in combination with nuclear batteries and it may therefore be necessary to provide some shielding to protect the personnel necessary to operate the prime mover. This shielding could be incorporated into the frame 10 but does not otherwise form a part of this invention.

Figure 3:
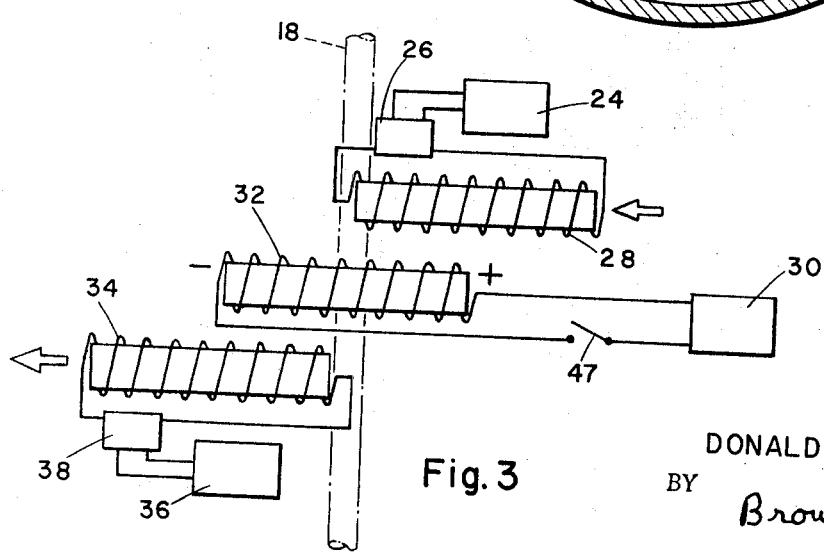
FIG. 3 is a diagrammatic view showing the relationship of the magnetic coils.

Referring now to FIG. 3, there is illustrated the relative positioning of AC electromagnetic coils 34 (as mounted on rotor 14) and 28 (as mounted on rotor 16) with respect to a DC coil 32 (as mounted on stator 12), the DC coil has a fixed magnetic polarity, as is illustrated by plus and minus signs. The amount of attractive force exerted by the AC electromagnetical coil 34 will vary during the travel of that core toward and away from the fixed coil 32 as the stator rotates. To smooth out the power fluctuations which would result from the amount of force being varied by the positioning of the coil, the second rotor 16 containing the plurality of coils 28 is rotationally staggered from the positioning utilized on the first rotor 14, so that the coil 28 moves into the same relative position as is being vacated by the coil 34, just as the trailing edge of the coil 34 leaves that electromagentic area, producing a substantially continuous force being transferred between the stator and rotors.

OPERATION

Nuclear batteries would be installed into the prime mover and electrically connected to the flip-flops on the rotors and to the coils on the stator. The flow of electrical power from the batteries on the stator to the coils, is not permitted to begin until the rotor is brought up to a speed, corresponding to the synchronous speed, selected for that prime mover. The initial spin up is accomplished with switch 47 in the off position. The spin up can be accomplished with relatively little power since there is no force being transferred, and when the spin up is complete, the switch 47 is turned on, connecting all the batteries to the coils. Subsequently the force will be transferred from the AC coils on the stator to maintain the stators rotation at the synchronous speed the synchronous speed is determined by the frequency selected for the flip-flops and is that speed which results in the flip-flops changing the polarity of the AC coils just as their advancing end is adjacent the end of the DC magnet, thereby changing the polarity to cause the leading end of the AC magnet to switch from being attracted toward second end of the DC magnet to being repelled from the second end of the DC magnet. The prime mover will continue to operate in this manner at a selected speed for long periods of time. The rotation is continuous despite the failure of one or more flip-flops or batteries since the design of the prime mover of the invention makes it possible for the invention to operate despite the loss of one or more of the coils, with the power being reduced only by the contribution of the single coil.

Having described my invention, I now claim:

1. A prime mover with an internal DC power source comprising:

a plurality of fixed polarity magnets comprising a stator, said fixed polarity magnets fixed in a circular pattern with a line connecting opposed poles of each magnet being tangential to said circular pattern, a plurality of AC electromagnets comprising a rotor mounted in a circular pattern for rotation about the axis of said circular pattern adjacent to said stator, a line connecting the opposed ends of said AC electromagnets being tangential to said circular pattern, a source of AC power connected to said AC electromagnets and having a controlled frequency for attracting during movement toward and repelling during movement away from said fixed polarity magnet means, said source of AC power comprising a DC power source connected to a converter, said DC power source and said converter being mounted on said rotor, said converter changing DC power from said DC power source to AC power at a controlled frequency.

2. The prime mover according to claim 1 wherein: said fixed polarity magnet means comprises a coil connected to a DC power source mounted on said stator.

3. A prime mover according to claim 1 wherein:
said DC power source comprises at least one power cell means for converting energy from the spontaneous disintegration of atomic particles to electrical power.

4. A prime mover according to claim 1 wherein:
said converter comprises solid state switches alternately connecting the negative and positive terminals of said DC power source to opposite ends of said AC electromagnet.

5. A prime mover according to claim 1 comprising:
at least two rotors mounted coaxially and on opposite sides of said stator,
said AC electromagnets on opposite rotors being rotationally displaced with respect to corresponding AC electromagnetic magnets on the other of said rotors.

6. A prime mover according to claim 5 wherein:
said rotational displacement approximates an angle corresponding to four times the number of said AC electromagnets on each of said rotors divided into 360°.

* * * * *